US012752333B2

(12) United States Patent
Duscher et al.

(10) Patent No.: US 12,752,333 B2
(45) Date of Patent: Oct. 6, 2026

(54) BENDING MACHINE AND METHOD FOR PROCESSING A WORKPIECE BY MEANS OF A BENDING MACHINE

(71) Applicant: EVOBEND GMBH, Ainring (DE)

(72) Inventors: Nikolaus Duscher, Salzburg (AT); Reinhard Emil Franze, Siezenheim (AT)

(73) Assignee: EVOBEND GMBH, Ainring (DE)

(*) Notice: Subject to any disclaimer, the term of this patent is extended or adjusted under 35 U.S.C. 154(b) by 289 days.

(21) Appl. No.: 17/776,583

(22) PCT Filed: Nov. 12, 2020

(86) PCT No.: PCT/EP2020/081890
§ 371 (c)(1),
(2) Date: May 12, 2022

(87) PCT Pub. No.: WO2021/094444
PCT Pub. Date: May 20, 2021

(65) Prior Publication Data

US 2022/0379366 A1 Dec. 1, 2022

(30) Foreign Application Priority Data

Nov. 13, 2019 (DE) ..................... 10 2019 007 884.5

(51) Int. Cl.
*B21D 55/00* (2006.01)
*B21D 5/00* (2006.01)
(Continued)

(52) U.S. Cl.
CPC ............. *B21D 55/00* (2013.01); *B21D 5/004* (2013.01); *F16P 3/001* (2013.01); *F16P 3/003* (2013.01);
(Continued)

(58) Field of Classification Search
CPC . B21D 55/00; F16P 3/001; F16P 3/003; F16P 3/02; F16P 3/04; F16P 3/08; F16P 3/12
See application file for complete search history.

(56) References Cited

U.S. PATENT DOCUMENTS 4,078,451 A * 3/1978 Norton ...................... F16P 3/04
74/613
6,131,429 A * 10/2000 Ward ........................ F16P 3/08
72/1
(Continued)

FOREIGN PATENT DOCUMENTS

AT 520038 A1 12/2018
DE 19923528 A1 11/1999
(Continued)

OTHER PUBLICATIONS

Search Report issued by the German Patent Office for German Patent Application No. 10 2019 007 884.5, dated Apr. 30, 2020.
(Continued)

*Primary Examiner* — Christopher L Templeton
*Assistant Examiner* — Matthew Stephens
(74) *Attorney, Agent, or Firm* — Bradley Arant Boult Cummings LLP; Henry B. Ward, III

(57) ABSTRACT

A bending machine, in particular a swivel bending machine, is provided that defines a safety-relevant work area in which an operator of the bending machine is present during its operation, loading, unloading or the like, having a safety module comprising a safety barrier which provides a variable-size shield for the safety-relevant work area such that a shut-off state and an access state can be generated, wherein in the shut-off state access to the safety-relevant work area is at least partially restricted and wherein in the access state access to the safety-relevant work area is at least partially
(Continued)

granted. A method is provided for processing a workpiece by means of a bending machine.

20 Claims, 10 Drawing Sheets

(51) Int. Cl.

| | |
|---|---|
| ***F16P 3/00*** | (2006.01) |
| ***F16P 3/02*** | (2006.01) |
| ***F16P 3/04*** | (2006.01) |
| ***F16P 3/08*** | (2006.01) |
| ***F16P 3/12*** | (2006.01) |

(52) U.S. Cl.
CPC *F16P 3/02* (2013.01); *F16P 3/08* (2013.01); *F16P 3/04* (2013.01); *F16P 3/12* (2013.01)

(56) References Cited

U.S. PATENT DOCUMENTS

| | | | | |
|---|---|---|---|---|
| 2020/0061691 | A1 * | 2/2020 | Denkmeier | F16P 3/04<br>74/613 |
| 2021/0121930 | A1 * | 4/2021 | Denkmeier | B21D 5/0254<br>74/613 |

FOREIGN PATENT DOCUMENTS

| | | | | | |
|---|---|---|---|---|---|
| DE | 202006009653 | U1 | | 9/2006 | |
| DE | 102013111570 | A1 | | 4/2015 | |
| EP | 0035522 | A1 | | 9/1981 | |
| EP | 1985412 | A1 | | 10/2008 | |
| GB | 780573 | A | * | 8/1957 | F16P 3/02 |
| GB | 1041926 | A | * | 9/1966 | F16P 3/04 |
| JP | H0584415 | U | | 11/1993 | |
| WO | WO-2013015272 | A1 | * | 1/2013 | B21D 5/0254 |
| WO | 2015198295 | A1 | | 12/2015 | |
| WO | 2020019012 | A1 | | 1/2020 | |

OTHER PUBLICATIONS

"DGUV: Folding machines and Long Folding Machines: Protective Measures." Mainz, 2017.

International Search Report issued for International Patent Application No. PCT/EP2020/081890, dated Feb. 8, 2021.

International Preliminary Report on Patentability issued for International Patent Application No. PCT/EP2020/081890, dated Feb. 1, 2022.

Office Action issued by the Australian Patent Office for Australian Patent Application No. 2020382872, dated Aug. 7, 2024.

* cited by examiner

BENDING MACHINE AND METHOD FOR PROCESSING A WORKPIECE BY MEANS OF A BENDING MACHINE

FIELD OF THE INVENTION

The invention relates to a bending machine and a method for bending a workpiece by means of a bending machine.

BACKGROUND OF THE INVENTION.

Bending machines, in particular swivel bending machines, long folding machines or the like, with are used to process sheet metal or similar plate-shaped workpieces usually have a workpiece holder which is loaded with a workpiece by an operator before a bending process is carried out. In swivel bending machines and the like, the workpiece is clamped between an upper beam and a lower beam. The occurring clamping and bending forces as well as the presence of moving machine parts pose a significant risk to operators, especially on machines that are controlled manually. In the case of manually controlled machines, it is therefore necessary for the operator to be able to see all areas of the machine from where the command is issued to make sure no one is present in the machine's danger zone. Larger machines on which several operators work simultaneously are sometimes equipped with release pedals that each operator must use to agree to a command to be issued. There are several known emergency stop functions for bending machines, which are based, for example, on monitoring by means of a light curtain, a safety laser or a laser scanner.

All of these safety precautions are aimed at safeguarding a safety-relevant work area that sometimes has to be entered by an operator but should be kept clear during a bending process or should only be entered by skilled staff in order to prevent injuries. In order to clearly mark such a safety-relevant work area and to be able to reliably monitor it, especially in the case of semi-automatic and automatic bending processes, today's bending machines are often equipped with lateral barriers to limit the safety-relevant work area to the sides of the bending machine. Entry to and exit from the safety-relevant work area are therefore only possible from the front. Any components of optical detection units may then be attached to the barriers to reliably detect when a person enters the safety-relevant work area.

In practice, such barriers have proven to be very useful since a high degree of work safety can be achieved. Making it difficult to access the workpiece or the bending machine from the side, the barriers, however, may get in the way when the bending machine is to be loaded with a workpiece. If space in a production hall is limited, the barriers may also make access to other machines difficult. In such cases, the barriers may even be damaged, for example by forklifts maneuvering in a narrow production hall. As a result, users sometimes remove the barriers in an unauthorized and dangerous manner for more convenience. However, this obviously increases potential hazards considerably.

BRIEF SUMMARY OF THE INVENTION

In view of the above, it is an object of the present invention to improve the handling of a bending machine while ensuring a high degree of safety.

According to the invention, this object is achieved by a bending machine comprising the features of a bending machine which defines a safety-relevant work area in which an operator of the bending machine is present during its operation, loading, unloading or the like, wherein the safety-relevant work area is the area in front of the bending machine which at least uninvolved and/or unauthorized and/or non-instructed persons must not enter during a bending process for safety reasons, having a safety module, the bending machine comprising a safety barrier which is at least one selected from the group consisting of (i) planar and (ii) plate-shaped, which is retractable and extendable, and which provides a variable-size lateral shield for the safety-related work area such that a shut-off state and an access state can be generated, wherein in the shut-off state access to the safety-relevant work area is at least partially restricted and wherein in the access state access to the safety-relevant work area is at least partially granted. In one embodiment, the safety module comprises a linear guide for the safety barrier. In another embodiment, the safety module comprises a spring element that at least one selected from the group comprising (i) supports a movement of the safety barrier and (ii) damps a movement of the safety barrier. In another embodiment, a part of the safety barrier, which forms the variable-size shield, is free-floating in the shut-off state. In another embodiment. the safety module comprises a drive unit for the safety barrier, which is adapted to move the safety barrier. In another embodiment, the drive unit comprises a traction drive including a closed rotating traction mechanism. In another embodiment, the safety module comprises a control unit adapted to control the drive unit depending on a force applied to the safety barrier by an operator. In another embodiment, a release unit adapted to prevent or permit a bending process depending on at least one release signal, wherein the safety module is adapted to generate a release signal for the release unit depending on whether or not the shut-off state prevails. In another embodiment, the safety module comprises an optical detection unit and is adapted to generate a release signal for the release unit depending on a detection signal of the optical detection unit. In another embodiment, at least one component of the optical detection unit is arranged on the safety barrier in such a way that the component moves along with the safety barrier. In another embodiment, the safety module comprises a second safety barrier arranged opposite the safety barrier. In another embodiment, the shield is pivotably mounted about a pivot axis that extends vertically. In another embodiment, the safety module comprises a base plate on which the shield is pivotally mounted. In another embodiment, the safety module comprises a roller that supports the shield during pivoting and is spaced from the pivot axis. In another embodiment, the shield. in a pivot state, clears lateral access to both the safety-relevant work area and a workpiece holder of the bending machine, wherein the shield is movable to a non-pivot position in which at least one selected from the group consisting of (i) the shut-off state and (ii) the access state, are producible. In another embodiment, the part of the safety barrier forming the variable-size shield is free-floating in such a way that no floor-arranged guide elements are used. In another embodiment, the optical detection unit comprises a light barrier, wherein the light barrier is attached to the safety barrier such that it moves along with the safety barrier, and wherein the safety laser is arranged on a stationary component of the safety module and does not move along with the safety barrier.

In another embodiment, a safety module is provided for a bending machine which defines a safety-relevant work area in which an operator of the bending machine is present during its operation, loading, unloading or the like, wherein the safety-relevant work area is the area in front of the bending machine which at least uninvolved and/or unauthorized and/or non-instructed persons must not enter during a bending process for safety reasons, having a safety module, the bending machine comprising a safety barrier which is at least one selected from the group consisting of (i) planar and (ii) plate-shaped, which is retractable and extendable, and which provides a variable-size lateral shield for the safety-related work area such that a shut-off state and an access state can be generated, wherein in the shut-off state access to the safety-relevant work area is at least partially restricted, wherein in the access state access to the safety-relevant work area is at least partially granted, and wherein the shield is pivotably mounted about a pivot axis that extends vertically.

In another embodiment, a method is provided for processing a workpiece by means of a bending machine, wherein the bending machine defines a safety-relevant work area in which an operator of the bending machine is present during its operation, loading, unloading or the like, wherein the safety-relevant work area is the area in front of the bending machine which at least uninvolved and/or unauthorized and/or non-instructed persons must not enter during a bending process for safety reasons, wherein the bending machine comprises a safety barrier which is configured in the form of a surface and/or plate, which is retractable and extendable, and which helps to provide a variable-size lateral shield for the safety-related work area, the method comprising moving the safety barrier to create an access state in which access to the safety-relevant work area is at least partially granted; loading the bending machine with a workpiece; moving the safety barrier to create a shut-off state in which access to the safety-relevant work area is at least partially restricted; and processing the workpiece.

In yet another embodiment, a method is provided for processing a workpiece by means of a bending machine, wherein the bending machine defines a safety-relevant work area in which an operator of the bending machine is present during its operation, loading, unloading or the like, wherein the safety-relevant work area is the area in front of the bending machine which at least uninvolved and/or unauthorized and/or non-instructed persons must not enter during a bending process for safety reasons, wherein the bending machine comprises a safety barrier which is configured in the form of a surface and/or plate, which is retractable and extendable, and which helps to provide a variable-size lateral shield for the safety-related work area, the method comprising moving the safety barrier to create an access state in which access to the safety-relevant work area is at least partially granted; loading the bending machine with a workpiece; moving the safety barrier to create a shut-off state in which access to the safety-relevant work area is at least partially restricted; and processing the workpiece, the method comprising pivoting the shield about the pivot axis, thereby clearing lateral access to a workpiece holder of the bending machine; and loading the bending machine with a workpiece by laterally feeding the workpiece into the workpiece holder.

According to the invention, a bending machine is provided which defines a safety-relevant work area in which an operator of the bending machine is present during operation, loading, unloading or the like, having a safety module comprising a safety barrier which provides a variable-size, in particular lateral, shield for the safety-relevant work area in such a way that a shut-off state and an access state can be generated, wherein in the shut-off state access to the safety-relevant work area is at least partially restricted and wherein in the access state access to the safety-relevant work area is at least partially granted.

In addition, according to the invention, a safety module for such a bending machine is provided.

Furthermore, according to the invention, a method for processing a workpiece by means of a bending machine is provided, wherein the bending machine defines a safety-relevant work area in which an operator of the bending machine is present during operation, loading, unloading or the like, wherein the bending machine comprises a safety barrier with which a variable-size, in particular lateral, shield for the safety-relevant work area can be provided, comprising the steps of:

- Moving the safety barrier to create an access state in which access to the safety-relevant work area is at least partially granted;
- Loading the bending machine with a workpiece;
- Moving the safety barrier to create a shut-off state in which access to the safety-relevant work area is at least partially restricted;
- Processing the workpiece.

This makes it easier to handle a bending machine without compromising its safety. A bending machine is provided whose work area can be reliably secured on the one hand and, if need be, can be easily entered and exited on the other hand. This helps to achieve a high degree of safety while facilitating loading, operation and unloading of the bending machine. The fact that the work area is easily accessible whenever access is required motivates users to not make any unauthorized and dangerous modifications to the safety equipment of a bending machine. Another advantage is that damage to the bending machine due to confined space can be avoided.

The bending machine is in particular a swivel bending machine. However, according to the invention, it may also be a press brake, a long folding machine or another type of bending machine. The bending machine may, for example, be adapted to bend flat and/or plate-shaped workpieces. The workpieces may, for example, be sheet metal.

Reliable protection of both sides of the safety-relevant work area may be achieved in particular if the safety module comprises a second safety barrier that is arranged opposite the safety barrier. The two safety barriers may be arranged on opposite end faces of the safety-relevant work area. According to one embodiment, the safety barriers are independently movable in at least one operating mode. The safety module may also include further safety barriers, for example a third safety barrier, a fourth safety barrier, etc. The below explanations on the safety barrier may apply accordingly to one or more further safety barriers.

According to the invention, the lateral shield may be a mechanical and/or physical shield that people cannot break down but must walk around, for example. The safety barrier may be, for example, a safety wall, a fence element, a panel, a grid, a net or the like. Further, according to one embodiment, the safety barrier may be planar and/or plate-shaped. The shield is variable in size, which can easily be accomplished if the safety barrier is movable and/or variable in size and at least partially forms the shield. For example, in the access state, the effective area of the safety barrier may be smaller than in the shut-off state, whereby the variable size of the shield may be realized. The reduced or increased effective area of the safety barrier may be realized by changing an area of the safety barrier and/or by moving at least a portion of the safety barrier such that a portion of the safety barrier is more or less covered by other components of the bending machine such that a larger or a smaller portion of the safety barrier contributes to the effective area. The safety module may be adapted to generate several different shut-off states that are characterized in particular by shields of different size, for example by moving the safety barrier or the safety barriers into different positions.

The safety barrier may have a frame as well as wall elements secured to it. The safety barrier may define an interior space in which mechanical and/or electrical/electronic and/or optical components of the safety module are arranged.

The safety-relevant work area is located in particular directly in front of a workpiece holder of the bending machine. The workpiece holder may have an upper beam and/or a lower beam or generally at least one clamping beam for a workpiece. In a top view, viewing the upper side of the bending machine, for example, the safety-relevant work area may be rectangular in shape and/or extend along a width of the bending machine or the workpiece holder. An extension of an end face of the safety-relevant work area may be determined by safety specifications and be, for example, at least 50 cm, at least 80 cm or at least 100 cm. The safety-relevant work area may be next to a work area that is less or not safety-relevant and may be entered by persons during a bending process. The safety-relevant work area is in particular the area in front of the bending machine which at least uninvolved and/or unauthorized and/or non-instructed persons must not enter during a bending process for safety reasons. In the shut-off state, in particular, access to the safety-relevant work area is not physically restricted from the front but only from the side.

Moving the safety barrier to create the shut-off state may be at least semi-automatic or automatic in at least a semi-automatic mode and/or an automatic mode. According to the invention, the safety barrier may also be moved manually.

In particular, the safety barrier may have a robust design and/or simply be provided with different components if the safety barrier is retractable and extendable. According to one embodiment, a size of the safety barrier itself is invariable.

According to the invention, it may further be provided that the safety module comprises a linear guide for the safety barrier. Alternatively or additionally, the safety module may comprise a frame that embraces the safety barrier and guides its movement. The linear guide may be part of the frame. This enables to adjust movability of the safety barrier in a targeted and reliable manner which makes it easy to change the size of the shield. If the frame is U-shaped, whereby the safety barrier is displaceable parallel to the two legs of the U-shaped frame, the frame may guide the safety barrier on opposite sides to good advantage and define a stop for a retracted position of the safety barrier.

According to one embodiment, the safety module comprises a spring element that supports and/or dampens a movement of the safety barrier, thus achieving beneficial movement behavior of the safety barrier. The spring element may comprise a gas spring. Retraction and extension of the safety barrier may be equally supported if the spring element is pivotally secured to the frame of the safety module. For example, a first end of the spring element may be secured to the safety barrier on the rear side of the safety barrier, which faces away from the safety-relevant work area. A second end of the spring element may be pivotally secured to the frame of the safety module such that the spring element flips once when the safety barrier is moved from an extended position to a retracted position. Subsequently, the spring element may apply a force to the safety barrier that forces the safety barrier into the extended position when the safety barrier is approaching. Additionally, the spring element may apply a force to the safety barrier that forces the safety barrier into the retracted position when the safety barrier is approaching. When the safety barrier is retracted and extended manually, the spring element may be an advantage in supporting a movement of the safety barrier into its respective end positions. Furthermore, in this case, a force may be generated that an operator must first overcome when the safety barrier is to be moved out of one of its end positions, thus preventing accidental movement of the safety barrier.

According to the invention, it may further be provided that a part of the safety barrier which forms the variable-size shield is free-floating in the shut-off state. This makes it possible to do without guide elements on the floor, which would pose a trip hazard. It is therefore an advantage that the linear guide and/or the frame do not extend along the entire end faces of the safety-relevant work area but at most only along a part of the end face, for example no more than 50% or 30% or even 20% of its length. The safety barrier may be located apart from an installation plane of the bending machine, which is defined by installation points at which the bending machine contacts an installation surface.

The safety module may comprise a drive unit for the safety barrier, which is adapted to move the safety barrier. This enables a movement of the safety barrier to be automated and thus to achieve a high degree of ease of use and safety. The drive unit may comprise an electric motor. In one embodiment, this may be a servo motor or a stepper motor. According to the invention, a pneumatic, hydraulic and/or magnetic drive may also be provided. A high degree of flexibility with regard to achievable movement patterns of the safety barrier may be achieved if the safety module comprises a control unit that is adapted to control the drive unit. The control unit may be adapted to implement different operating modes of the safety module, such as a manual mode, a semi-automatic mode, and/or a fully automatic mode, which differ with respect to the movement control of the safety barrier. The safety module may comprise a user interface through which an operator signal can be input for controlling the drive unit, such as a button, a slider, a lever, a graphical user interface, a touch display, a keyboard, a mouse, a trackball or the like.

As an alternative or in addition to the availability of a user interface, the control unit may be adapted to control the drive unit depending on a force applied to the safety barrier by an operator, thus providing intuitive operability. For example, the control unit may control the drive unit in such a way that a movement of the safety barrier started by the operator is continued. According to the invention, it may further be provided that the control unit automatically switches to manual mode and retracts or extends the safety barrier when the operator applies the force to the safety barrier. The safety module may have a force sensor system for this purpose. The control unit may also be adapted to not activate the drive unit till the force applied by the operator exceeds a suitable threshold value, such as a threshold value of at least 20N, at least 50N, or at least 80N.

A drive that is reliable and has a favorable structure may be provided in particular if the drive unit comprises a traction drive including a closed rotating traction mechanism. The traction mechanism may be a belt and/or a chain, for example. The traction mechanism is in particular firmly connected to the safety barrier so that a traction force applied by a motor of the drive unit can be transmitted from the traction mechanism to the safety barrier.

It may further be provided that the bending machine comprises a release unit adapted to prevent or permit a bending process depending on at least one release signal. This makes it possible to define specific conditions that must be met in order to ensure safe bending. The release unit may be adapted to determine whether or not a release condition prevails based on several different release signals, in particular in a cumulative manner. For example, the bending machine may include a foot switch, a button or another manually actuated release device through which the operator (s) can generate a release signal. Alternatively or additionally, the user interface may be adapted to allow the operator to give release input. The release signal generated by the operator may be a first release signal. For example, at least in a semi-automatic mode, it may be necessary for the operator to enter a release signal before a bending process may be performed. The release unit may be adapted to prevent a bending process if there is no release state, for example by preventing that power is supplied to a bending unit of the bending machine.

According to one embodiment, the safety module may be adapted to generate a release signal depending on whether or not the shut-off state prevails, which means that in a semi-automatic or automatic mode, it can be reliably detected whether the safety-relevant work area is shielded by the safety barrier. This may be an automatically generated second release signal. The safety module may have suitable sensor technology and/or suitable circuitry adapted to detect a safety state of the safety barrier, for example whether the safety barrier is in the retracted or extended position.

The presence of persons in the safety-relevant work area can be reliably detected in particular if the safety module comprises an optical detection unit and is adapted to generate a release signal depending on a detection signal of the optical detection unit for the release unit. This may in particular be an automatically generated third release signal. According to one embodiment, the optical detection unit is adapted to implement access protection. The optical detection unit may comprise at least one light barrier. According to one embodiment, the light barrier may be configured as a light curtain, wherein a light curtain comprises, for example, at least three light beams arranged one above the other and/or side by side. The optical detection unit may, for example, comprise a horizontally installed light curtain and/or a vertically installed light curtain. Alternatively or additionally, the optical detection unit may comprise a safety laser. The safety laser may be adapted to implement a finger guard for the workpiece holder. Moreover, in accordance with the invention, it may be provided that the optical detection unit has a laser scanner to replace the light barrier or to supplement its functionality, which may be used to monitor a boundary of the safety-relevant work area and/or an interior of the safety-relevant work area in particular.

Work area monitoring can be especially reliable if at least one component of the optical detection unit is arranged on the safety barrier in such a way that the component moves along with the safety barrier. In particular if the component is at least part of the light barrier, in the shut-off state, it can be reliably detected whether a person enters the safety-relevant work area. According to one embodiment, the light barrier can limit the safety-relevant work area and/or define it on at least one side in the shut-off state. According to one embodiment, the light barrier is attached to the safety barrier in such a way that it moves along with the safety barrier, whereas the safety laser is attached to a stationary component of the safety module, not moving along with the safety barrier. Here, the light barrier may be adapted to monitor a boundary of the safety-relevant work area, whereas the safety laser may be set up to monitor an interior of the safety-relevant work area, in particular a loading edge of the workpiece holder.

The safety module may have a further drive unit for the second safety barrier. The second safety barrier and its guide may be in analogy to the safety barrier described above. The safety module may comprise two sub-modules, each including a safety barrier and the corresponding mechanics and electronics. According to one embodiment, a movement of both safety barriers can be controlled by means of the control unit of the safety module, wherein it may be provided that both safety barriers can be moved separately from each other in an automatic and/or semi-automatic manner.

According to a further embodiment of the invention, the shield may be pivotably mounted. This can be used to provide targeted access to the bending machine in certain situations. The shield may be pivotable about a pivot axis. This may be a single pivot axis. Corresponding pivoting may then be a motion along a circular path. In other embodiments, several pivot axes may be present and/or more complex pivoting may be executable, in particular pivoting along a movement path that is different from a circular path. This results in a wide range of possibilities for loading the bending machine while at the same time a high degree of work safety can be ensured. The pivot axis may extend vertically, for example parallel to a vertical direction of the bending machine and/or the safety module. The pivot axis may be arranged next to the bending machine. The pivot axis may be arranged next to a part of the bending machine that, viewed from the safety-relevant work area, is located behind the workpiece holder. Pivoting may expose end faces of the safety-relevant work area by pivoting the safety barrier backward and outward. For example, the safety barrier may be pivotable by exactly or at least 90 degrees.

Reliable attachment of the safety module may be achieved in particular if the safety module comprises a base plate on which the shield is pivotably mounted. The safety module may have any of the components described above, which are pivotably attached together as a sub-module on the base plate. The base plate may be adapted to be secured to and/or placed on an installation surface. The base plate may also be part of a machine frame of the bending machine. In general, according to the invention, it may be provided that the shield is pivotably attached to the machine frame.

Furthermore, it may be provided that the safety module comprises a support bearing that supports the shield. This is a simple and reliable way to enable pivotability. The support bearing may define the pivot axis. In general, a bearing may be provided that defines the pivoting that the shield can perform.

A robust movement mechanism may be provided in particular if the safety module comprises a running element, in particular a roller, which supports the shield during pivoting and, in particular, is spaced from the pivot axis. In some embodiments, it may be provided that the shield is supported on the running element in a front section and is secured to the base plate in a rear section through the support bearing. When the shield is pivoted, the running element may then move along a circular path section around the axis of rotation or around the support bearing. The running element may be configured without rails and, in particular, be adapted and/or arranged to run directly on an installation surface of the bending machine. The running element may also be configured, for example, as a glider, a rotatable ball or a roll.

Alternatively, the shield may be free-floating and, in particular, not comprise a roller. For example, the shield may be fastened and supported only in one section of the support bearing. A front section of the shield, for example a section arranged next to the safety-relevant work area in the non-pivot state, may then be adapted to float freely.

Irrespective of the support of the shield, as mentioned above, the safety barrier may be extendable in a free-floating manner, meaning that the associated advantages are present also in the case of a pivoting shield.

Lateral loading of the bending machine is facilitated in particular if in a pivot state, the safety barrier provides lateral access both to the safety-relevant work area and to a workpiece holder of the bending machine. The safety barrier may be moved into a non-pivot position in which the shut-off state and/or the access state may be generated. The safety barrier may be pivoted independently of the shut-off state or the access state, for example when the safety barrier is in a retracted and in an extended state.

The invention further relates to a method using a bending machine comprising at least one safety module including a pivotable shield. The method may be a method according to the invention described above. The method comprises the step of pivoting the shield about the pivot axis, thus clearing lateral access to a workpiece holder of the bending machine. The method further comprises the step of loading the bending machine with a workpiece by laterally feeding the workpiece into the workpiece holder. This allows workpieces to be fed in a way that is impossible when the shield is in the non-pivot state even if otherwise in the access state. It may be provided, for example, that the safety barrier laterally covers the workpiece holder in the non-pivot state and in the access state.

BRIEF DESCRIPTION OF THE SEVERAL VIEWS OF THE DRAWING

Exemplary preferred embodiments of the invention are explained in more detail below with reference to the accompanying drawings, of which.

Several aspects of the invention are illustrated below. In addition, the exemplary embodiments of the invention are exemplified with a specific number of modules, elements and units as well as for a specific embodiment of the invention. For the skilled person, it will be obvious that the presented features as well as their technical effect are transferable to a deviating number and/or modified embodiments within the scope of the claims. Moreover, the skilled person will make useful combinations of the presented features and effects within the scope of the claims.

DETAILED DESCRIPTION OF THE INVENTION

Figure 1:
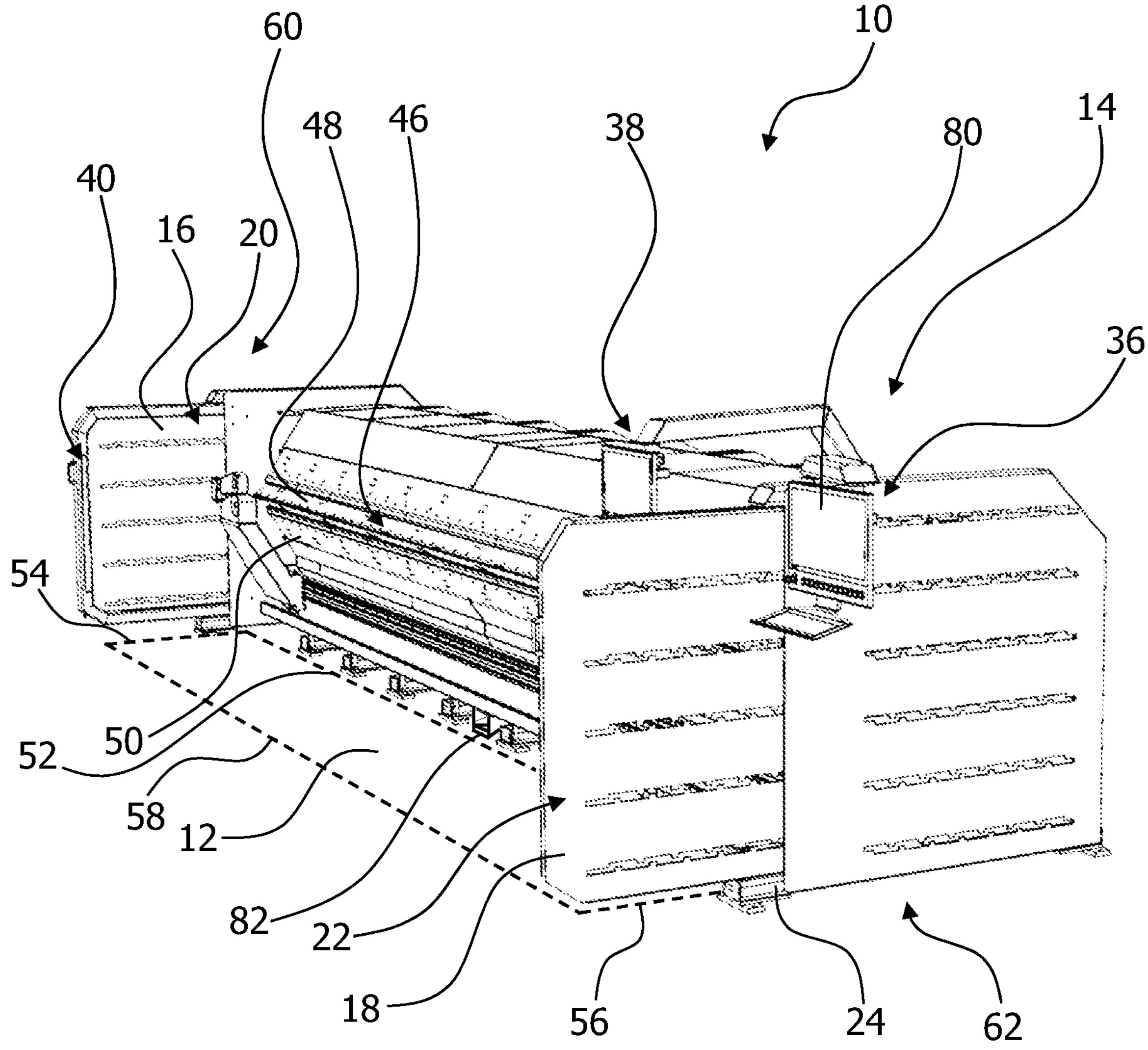
FIG. 1 is a schematic perspective view of a bending machine according to the invention.

FIG. 1 is a schematic perspective view of a bending machine 10 according to the invention. The bending machine 10 comprises a workpiece holder 46 including an upper beam 48 and a lower beam 50 for clamping and holding a workpiece to be bent. In the present case, the bending machine 10 is an exemplary swivel bending machine. However, as mentioned above, other types of bending machines may be implemented according to the invention.

The bending machine 10 defines a safety-relevant work area 12 in which an operator of the bending machine 10 is present during its operation, loading, unloading, or the like. The safety-relevant work area 12 adjoins the workpiece holder 46 with a first longitudinal side 52, wherein the longitudinal side 52 extends parallel to a transverse direction of the workpiece holder 46. In the present case, the safety-relevant work area 12 extends across an entire width of the workpiece holder 46. The safety-relevant work area 12 has two opposing end faces 54, 56 that extend parallel to end faces of the bending machine 10. In addition, the safety-relevant work area 12 has a second longitudinal side 58 opposite the longitudinal side 52, which establishes a border between the safety-relevant work area 12 and the environment.

The bending machine 10 includes a safety module 14. The safety module 14 includes a first side wall 60 and a second side wall 62 forming side walls of the bending machine 10. The side walls 60, 62 may be configured as sub-modules of the safety module 14.

The safety module 14 includes a first safety barrier 16 that provides a variable-size first shield 20 of the safety-relevant work area 12 such that a shut-off state and an access state are producible, wherein in the shut-off state access to the safety-relevant work area 12 is at least partially restricted and wherein in the access state access to the safety-relevant work area 12 is at least partially granted. The first safety barrier 16 is part of the first side wall 60.

In the following, the function of the safety module 14 is described in more detail with reference to the first side wall 60 and/or the first safety barrier 16 and the first shield. Except for optical components described in more detail below, the second side wall 62 is configured in analogy to the first side wall 60, i.e. in the illustrated case, they substantially are mirror symmetrical. Accordingly, the second safety barrier 18 is configured, mounted and driven in analogy to the first safety barrier 16 (see below).

Figure 2:
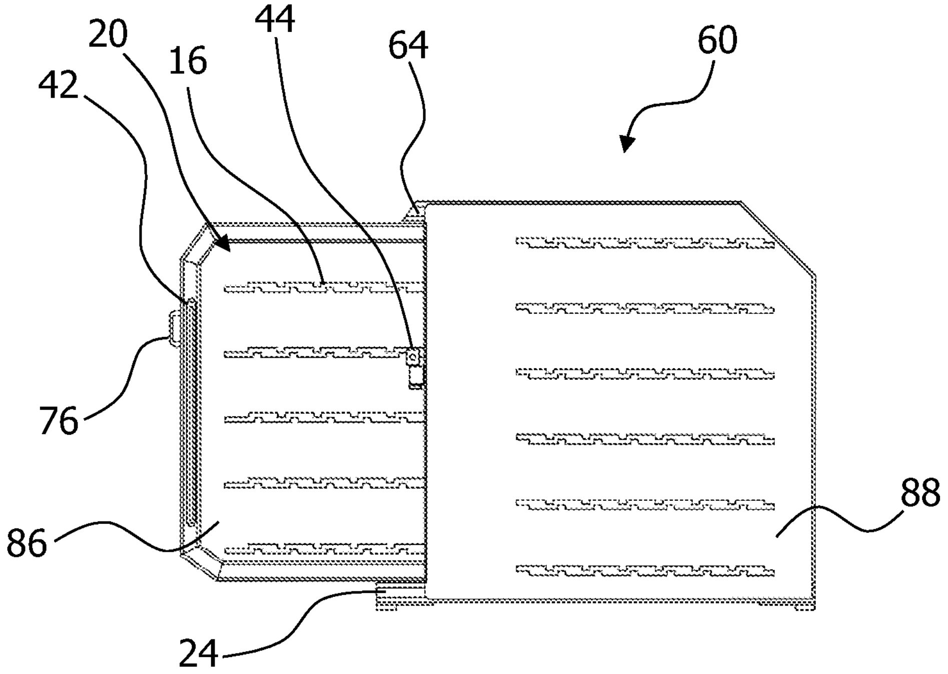
FIG. 2 is a schematic side view of a side wall of the bending machine in an access state.
Figure 3:
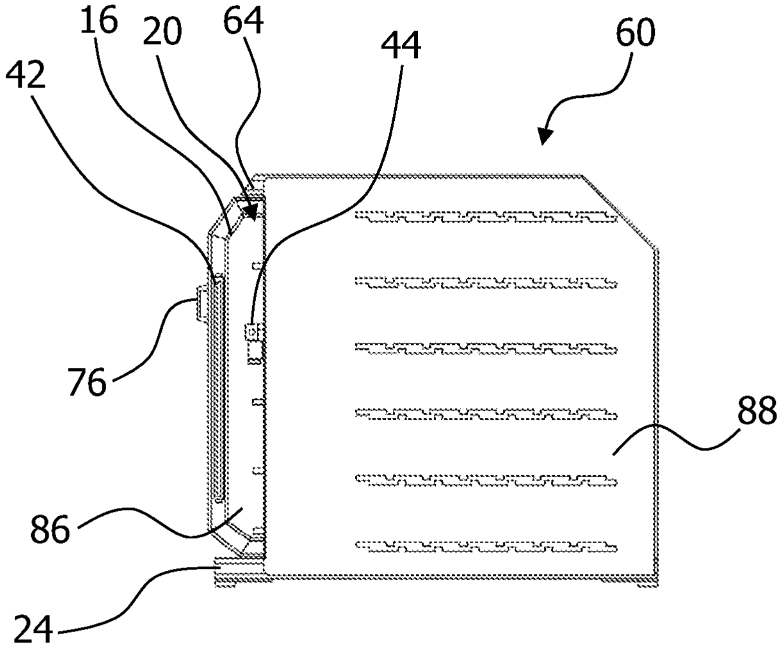
FIG. 3 is a schematic side view of the side wall in a shut-off state.
Figure 4:
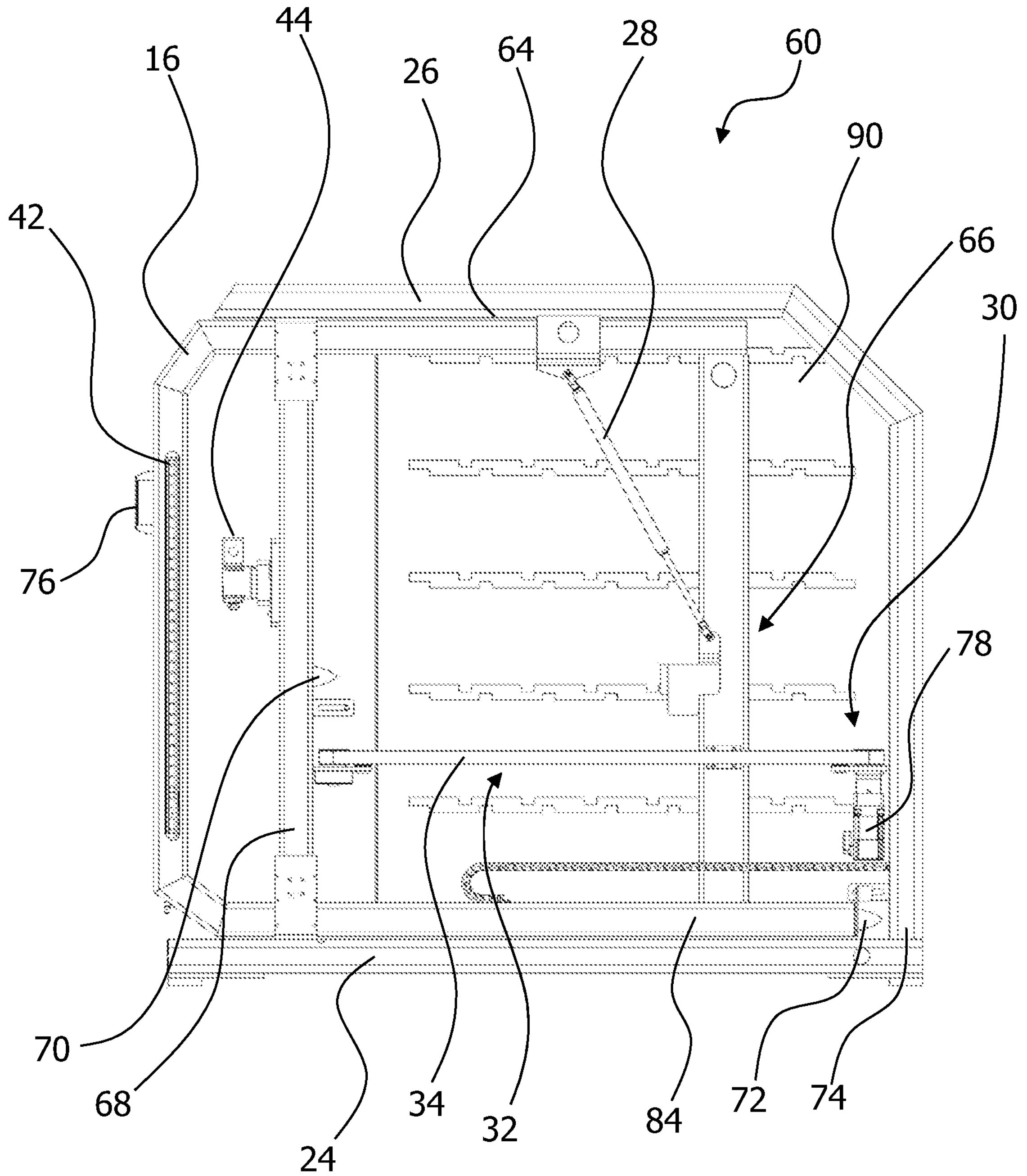
FIG. 4 is a schematic side view of an interior of the side wall in the access state.
Figure 5:
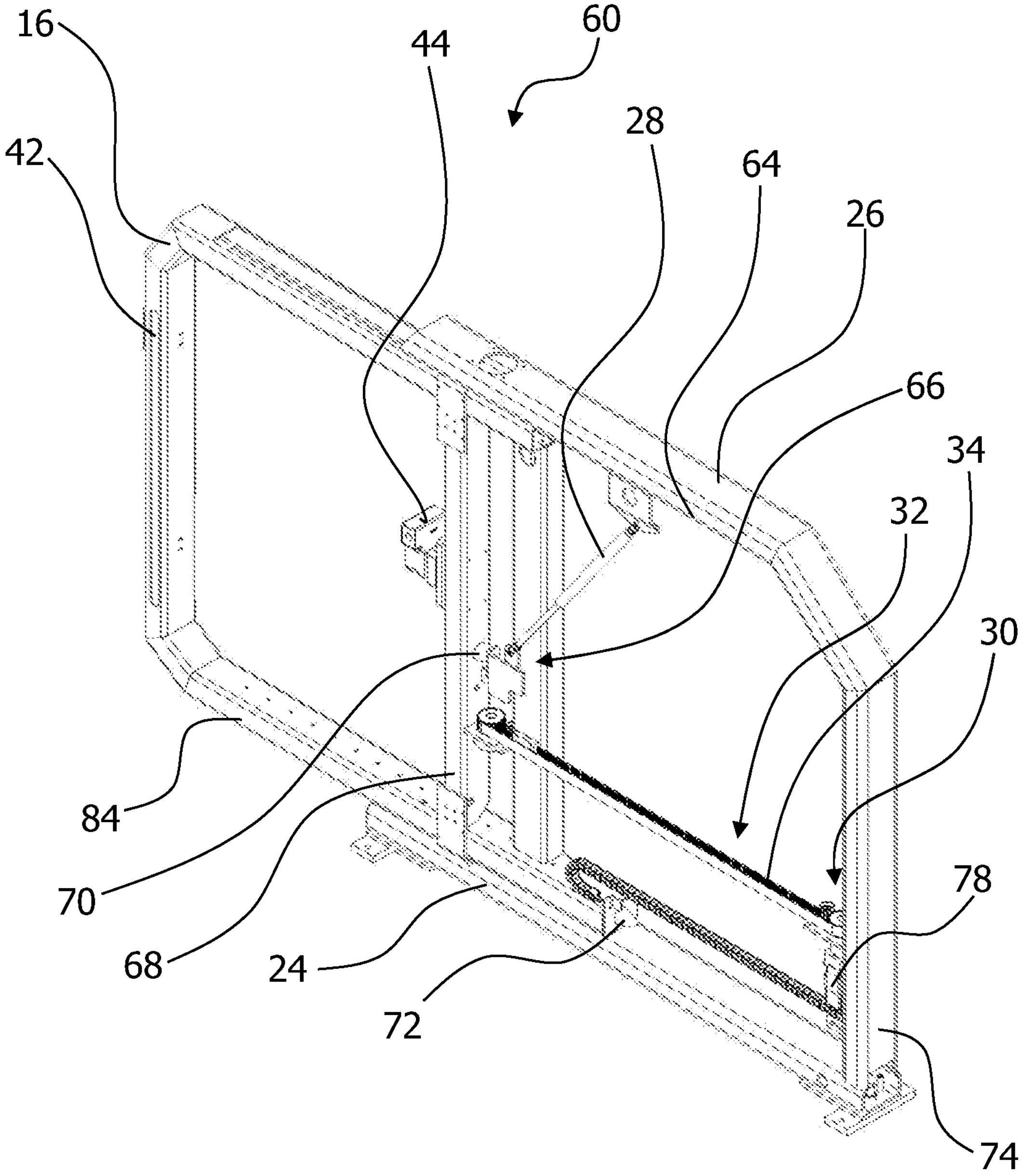
FIG. 5 is a schematic perspective view of the interior of the side wall in the shut-off state.
Figure 6:
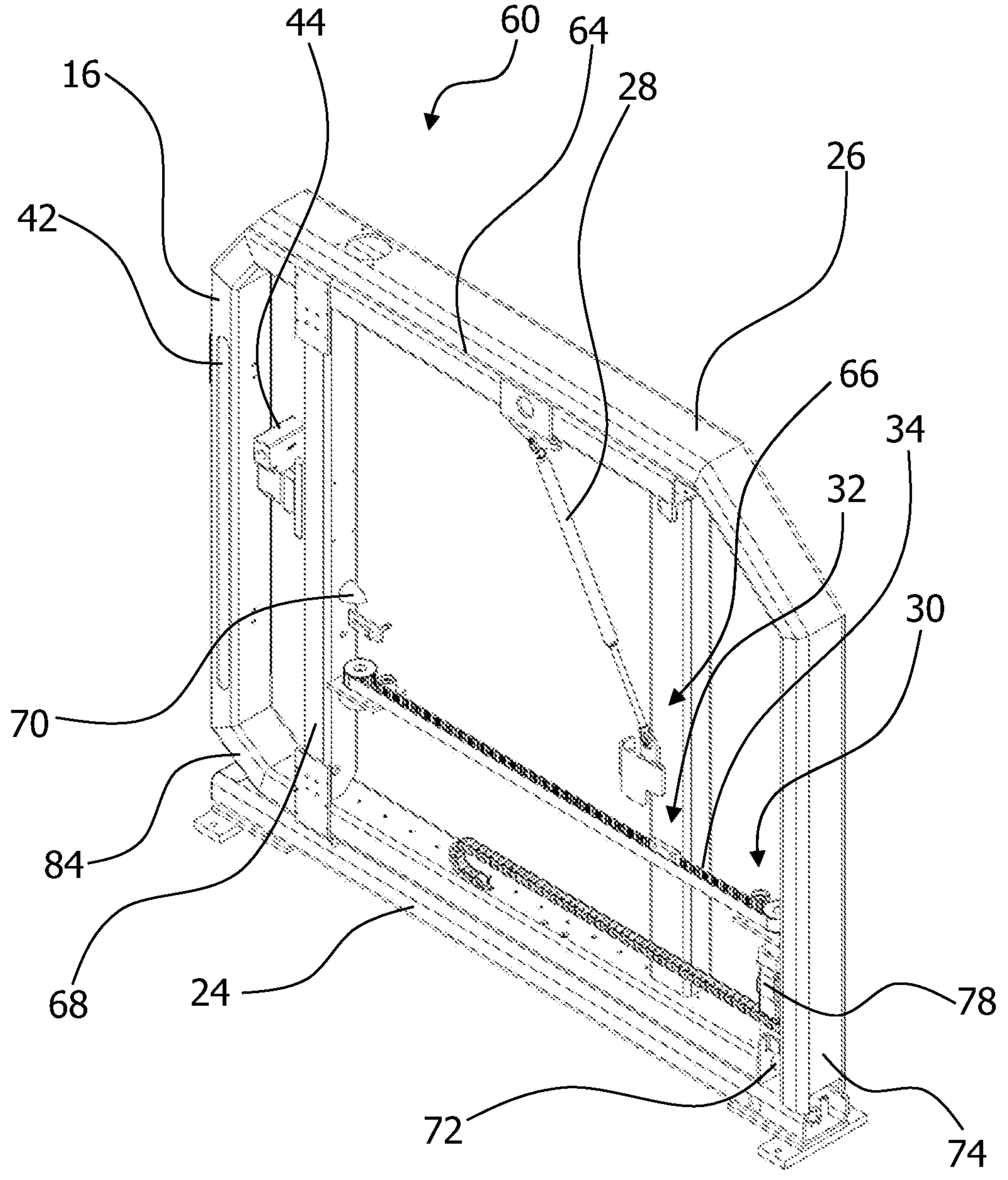
FIG. 6 is a schematic perspective view of the interior of the side wall in the access state.

In FIGS. 2 and 5, the first side wall 60 is shown in more detail in the shut-off state. In FIGS. 3, 4 and 6, the first side wall 60 is shown in more detail in the access state. In the following, reference is made to FIGS. 2 to 6.

The first safety barrier 16 is movable between an extended position, shown in FIGS. 2 and 5, and a retracted position, shown in FIGS. 3, 4 and 6. The size and/or effective area of the first shield 20 may thus be changed by retracting and extending the first safety barrier 16. In this case, the first safety barrier 16 is movable parallel to the first end face 54 of the safety-relevant work area 12.

In the shut-off state, the first safety barrier 16 is in a shut-off position in which the first safety barrier 16 blocks lateral access to the safety-relevant work area 12, i.e. access via the first end face 54 of the safety-relevant work area 12. In the access state, the first safety barrier 16 is retracted into an access position so that access via the first end face 54 of the safety-relevant work area 12 is granted.

The safety module 14 includes a frame 26 that embraces the first safety barrier 16 and guides its movement. The first safety barrier 16 is retractable into or extendable from the frame 26. The safety module 14 includes a linear guide 24 for the first safety barrier 16. In the illustrated case, the frame 26 forms two linear guides 24, 64 that guide the first safety barrier 16 at its bottom and top, respectively. The frame 26 is part of the first side wall 60. The first side wall 60 further comprises cover elements 88, 90 (cf. FIGS. 2, 3 and 4) that are secured to the frame 26 and cover it from opposite sides. The cover elements 88, 90 form outer surfaces of the first side wall 60. FIG. 4 shows only one of the cover elements, no cover element is shown in FIGS. 5 and 6.

The safety module 14 further comprises a spring element 28 that supports and/or dampens a movement of the first safety barrier 16. In the present case, the spring element 28 is configured as a gas spring. The spring element 28 has a first end that is pivotally secured to the frame 26 and a second end that is pivotally secured to a rear portion 66 of the first safety barrier 16 disposed within the frame 26. When the first safety barrier 16 moves from the access position to the shut-off position, the spring element 28 flips once such that it applies a compressive force on the first safety barrier 16 respectively, urging the first safety barrier 16 into the corresponding position.

A stop element 70 is arranged on a front strut 68 of the frame 26, which forms a front stop for the first safety barrier 16. This defines the shut-off position of the first safety barrier 16.

A further stop element 72 is attached to a rear side of the first safety barrier 16, which together with a rear strut 74 of the frame 26 forms a rear stop for the first safety barrier 16. This defines the access position of the first safety barrier 16. The stop element 70 and/or the further stop element 72 may be configured, for example, as a rubber stop.

The first safety barrier 16 includes a frame element 84 defining an interior space in which various components of the safety barrier 16 and/or the safety module 14 are arranged. A wall element 86 is arranged on at least one side of the frame element 84 and forms an outer surface of the safety barrier 16.

Two wall elements 86 may also be provided, which cover the frame element 84 from opposite sides and define an interior space for said components together with the frame element.

In addition, the first safety barrier 16 includes a drag chain 88 to guide cables to electrical and optical components that are movable with the safety barrier 16, such as components of the optical detection unit 40 described below.

As can be seen in FIGS. 2 and 5, a part of the first safety barrier 16 that forms the variable-size shield 20 is free-floating in the shut-off state. The linear guides 24, 64 are located only in a section of the frame 26. In the extended state, however, the first safety barrier 16 protrudes from the frame with a protruding portion that is not supported from below. The first safety barrier 16 is thus free-floating in its shut-off position, meaning that there are no guide components below the extended safety barrier 16 and outside the frame that could pose a trip hazard when the safety barrier 16 is in its retracted state.

The first safety barrier 16 includes a handle 76 attached to a front side of the first safety barrier 16. Via the handle 76, an operator can apply a force to the first safety barrier 16 to move it.

According to one embodiment of the present invention, the first safety barrier 16 is movable purely mechanically or manually. The spring element 28 may support a movement of the first safety barrier 16 by a force applied by an operator.

In the illustrated embodiment, however, the safety module 14 has a drive unit 30 for the safety barrier 16. The drive unit 30 comprises an electric motor 78 and a traction drive 32 with a closed rotating traction mechanism 34, such as a belt or a chain. The traction mechanism 34 is permanently connected to the first safety barrier 16 at at least one point so that the safety barrier 16 is pulled along when the traction mechanism 34 rotates upon actuation of the electric motor 78.

The safety module 14 further comprises a control unit 36 adapted to control the drive unit 30. The control unit 36 may be integrated in a central control unit (not shown) of the bending machine 10, which controls a bending unit of the bending machine 10 during a bending process as well as its drives (not shown). Alternatively, the control unit 36 of the safety module 14 may be connected to the central control unit via an appropriate communication link.

The control unit 36 controls the drive unit 30 depending on a current operating condition to extend or retract the first safety barrier 16. In the embodiment shown, the control unit 36 is adapted to control the drive unit 30 as a function of a force applied to the first safety barrier 16 by an operator. The safety module 14 is equipped with a suitable force sensor system for this purpose. If the control unit 36 determines, based on a detected actuation force, that the operator is moving the first safety barrier 16, the control unit 36 controls the drive unit 30 to support the movement.

In the illustrated case, the safety module 14 further comprises a user interface 80 that is configured as a graphical user interface. The user interface 80 may, for example, be configured as a touch display, have a monitor and an input means, etc. Via the user interface 80, an operator may select an operating mode, wherein different operating modes are described in more detail below. Furthermore, a command may be entered via the user interface by means of which the control unit 36 is caused to control the drive unit 30 and move the first safety barrier 16. Thus, an operator may also change the position of the first safety barrier 16 by providing user input via the user interface 80.

According to one variant of the invention, detection of the force applied by the operator may be omitted. According to this variant, the first safety barrier 16 is only moved in response to user input via the user interface 80.

As mentioned above, in the illustrated case, the safety module 14 comprises two side walls 60, 62 which are analogous in construction, each having a retractable and extendable safety barrier 16, 18. Generally, the safety barriers 16, 18 are moved parallel to each other. However, for example, in the event that a force applied by an operator is detected at one of the safety barriers 16, 18, only the safety barrier concerned or both safety barriers 16, 18 may optionally be moved. Via the user interface 80, the operator may, for example, preset the corresponding behavior of the safety module 14. In the latter case, the control unit 30 controls the respective drive units of the safety barriers 16, 18 to retract or extend them when a force is detected at a safety barrier. In the first case, only the safety barrier 16, 18 concerned is moved.

According to the invention, both safety barriers 16, 18 may at least partially be extended at the same time in the shut-off state. However, as noted above, shut-off states may be provided in which only one of the safety barriers 16, 18 is extended or in which the safety barriers 16, 18 are extended to different extents.

Various safety concepts for releasing a bending process are described below. In the embodiment shown, these safety concepts may be used complementarily or cumulatively. Other embodiments of the invention may use only individual or parts of the described concepts.

The bending machine 10 comprises a release unit 38, which may be integrated in the central control unit of the bending machine 10 (not shown) or in the control unit 36 of the safety module 14, for example, or configured separately. The release unit 38 is adapted to release a bending process in a release state and to prevent a bending process if there is no release state. For this purpose, the release unit 38 is adapted to determine whether there is a release state on the basis of one or more release signals.

A first release signal may be generated by an operator via a foot switch 82. The foot switch 82 shown in FIG. 1 is an example and may be arranged at any suitable position inside or outside the safety-relevant work area. The foot switch 82 may be a mere enabling or acknowledging switch or may additionally serve to operate the bending unit of the bending machine 10. The foot switch 82 is arranged in such a way that an operator actuating the foot switch 82 can see the entire safety-relevant work area 12 from their location in order to determine whether or not it is safe to release the bending process.

A second release signal may be generated by the safety module 14 based on whether the shut-off state prevails. For example, the second release signal is generated when both safety barriers 16, 18 or at least one of the safety barriers 16, 18 are/is extended.

A third release signal may be generated by an optical detection unit 40 of the safety module 14. In the illustrated case, the optical detection unit 40 comprises a light barrier 42 and a safety laser 44.

The light barrier 42 is attached in a front section of the first safety barrier 16 and interacts with opposing components attached in a front section of the second safety barrier 18. The light barrier 42 is configured as a light curtain. Light beams of the light curtain extend parallel to the second longitudinal side 58 of the safety-relevant work area 12, the light beams being arranged vertically one above the other. This enables the light barrier 42 to detect an intrusion into the safety-relevant work area 12 at different heights. The light barrier 42 moves along with the first safety barrier 16 and with the second safety barrier 18.

The light barrier 42 may define the second longitudinal side 58 of the safety-relevant work area 12. When the safety barriers 16, 18 are only partially extended, the light barrier 42 defines, for example, a smaller safety-relevant work area 12 than when the safety barriers 16, 18 are fully extended.

The safety laser 44 is attached to the frame 46 and is stationary in relation to it, i.e. the safety laser 44 does not move along with the moving safety barriers 16, 18. The safety laser 44 generates laser beams running parallel to the first longitudinal side 52 of the safety-relevant work area 12, which are arranged at the level of the tool holder 46. The safety laser 44 helps to detect whether an operator or, for example, their hands or fingers are too close to the tool holder 46, which would involve a risk of injury during the bending process.

In the illustrated case, the safety module 14 is adapted to generate the third release signal only when detection is negative in each of the light barrier 42 and the safety laser 44. Alternatively, the safety module 14 may be adapted to generate a third release signal depending on detection of the light barrier 42 and a fourth release signal depending on detection of the safety laser 44.

In some embodiments, the safety module 44 may include only the light barrier 42 or only the safety laser 44 or even none of them.

According to a first safety concept, only the first release signal is retrieved.

According to a second safety concept, a bending process may be released when there is either the first release signal or a combination of the second release signal and the third release signal. According to this concept, the first release signal generated by the operator causes any detection by the safety module 14 to be ignored. However, if the safety-relevant work area 12 is shut off by the safety barriers 16, 18 and if there is no positive optical detection by the optical detection unit 40, it is concluded that, even in the absence of the first release signal, there are no persons in the safety-relevant work area 12 and that a bending process may be performed safely. In the second safety concept, it will be an advantage if the operator can generate the first release signal from a position outside the safety-relevant work area 12.

According to a third safety concept, the foot switch 82 is deactivated or not available. In this case, the release of the bending process depends only on the position of the safety barriers 16, 18 and optical detection. According to this safety concept, the operator may enter a release signal via the user interface 80. For this purpose, the user interface is conveniently arranged outside the safety-relevant work area. In this case, the operator provides the information that the bending machine 10 is loaded and the safety-relevant work area 12 is cleared. Subsequently, monitoring of the work area 12 by means of the light barrier 42 and/or the safety laser 44 is sufficient to detect a person re-entering the work area 12.

The release unit 38 is configured to monitor an ongoing bending process. If at least one of the release signals required for the current safety concept is missing, the release unit 38 stops the ongoing bending process. If at least one of the required release signals is missing before the bending process, the release unit 38 prevents the process from being carried out till the required release signals are available.

Figure 7:
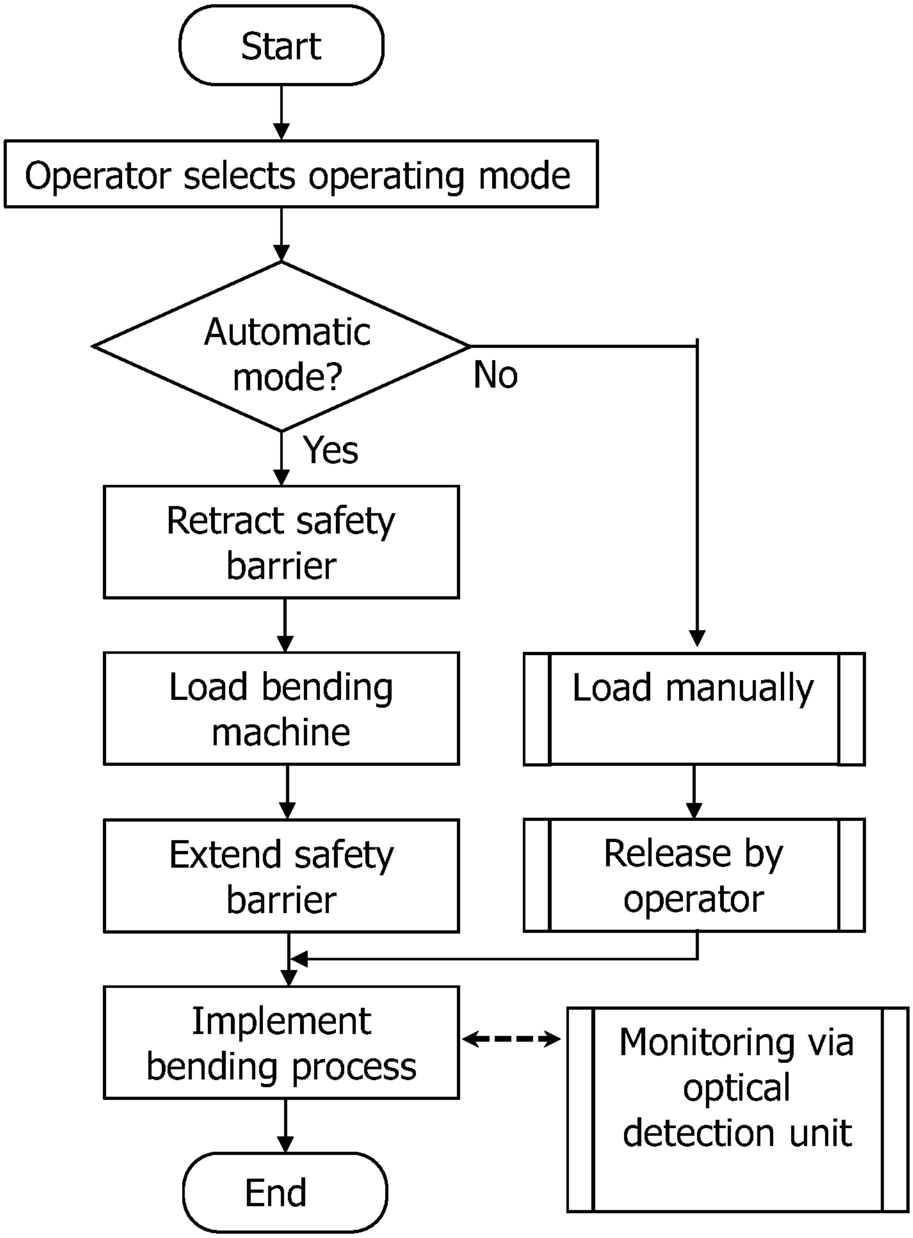
FIG. 7 is a schematic flow diagram of a method according to the invention.

Basically, the bending machine 10 of the shown embodiment may be operated in an automatic mode and in a semi-automatic mode. In this respect, reference is made to the flow chart in FIG. 7, which illustrates a method according to the invention for processing a workpiece by means of the bending machine 10.

To process a workpiece, the operator first selects the semi-automatic or automatic mode.

If the semi-automatic mode has been selected, the operator loads the machine with a workpiece and then enters a release signal, for example via the foot switch 82 and/or the user interface 80. After this, the bending process is carried out.

The bending process may be monitored by the optical detection unit. This is particularly useful when the operator selects a setting in which the light barrier 42 and the safety laser 44 are used. For this purpose, before releasing the bending process, the operator brings the safety barriers 16, 18 into their shut-off positions and establishes the shut-off state.

Alternatively, the operator may do without monitoring by the optical detection unit and optionally leave the safety barriers 16, 18 in their retracted positions.

According to one variant, at least the safety laser 44 is always used. If a person reaches into a beam of the safety laser 44 during the bending process, i.e. comes too close to the workpiece holder 46, the optical detection unit detects this and the safety module 14 stops generating the third or fourth release signal. In this case, the release unit 38 immediately stops the bending process to prevent injuries.

If, on the other hand, the automatic mode has been selected, the safety barriers 16, 18 are automatically moved into their access positions, i.e. the access state is established. An operator may then enter the safety-relevant work area 12 via its end faces 54, 56, if required.

When the bending machine 10 has been loaded with a workpiece to be processed, the safety barriers 16, 18 are automatically moved into their shut-off positions, i.e. the shut-off state is established. It is then no longer possible to enter the safety-relevant work area 12 via its end faces 54, 56. In addition, the optical detection unit 40 is activated, i.e. it is monitored if a person enters the safety-relevant work area 12 through the light barrier 42 and if an object or person comes too close to the tool holder 46 and interrupts the safety laser 44.

Subsequently, the operator may have to acknowledge, e. g. via the user interface 80, that the machine has been loaded and that the safety-relevant work area 12 has been cleared.

After that, the bending process is performed, which is again monitored by the optical detection unit 40.

In addition or alternatively, a manual mode may also be provided. This mode may do without monitoring by the optical detection unit 40 so that release is solely effected by the operator entering a release signal.

The safety concepts described may be implemented with safety barriers 16, 18 that are movable only manually when no drive units are available or when the drive units are deactivated or, as in the illustrated case, when the drive units are activated.

According to a variant of the invention, several different shut-off positions may be provided for the safety barriers 16, 18, in which the safety barriers 16, 18 are extended by different distances and/or offset relative to one another. The control unit 36 may be adapted to move into the different shut-off positions via the drive unit 30.

Furthermore, according to a variant of the invention, the spring element 28 and/or the handle 76 may be omitted. The safety barriers 16, 18 may then only be moved by the drive unit 30, especially into any shut-off position.

In addition, further combinations of release signals are possible. In particular, additional monitoring devices may be provided, such as another light barrier, a laser scanner or several acknowledgement switches for several operators. It may further be provided that information on the proper condition of the bending machine is retrieved in several stages before the release by the operator. In particular, if the safety barriers are moved manually, information may be retrieved for each safety barrier as to whether the user caused it to move into shut-off position.

In the following, further embodiments of the invention or alternative embodiments are described, primarily explaining the differences between the embodiments. It is understood that components not described or not described in more detail may be omitted or may be like those in the above embodiment.

Figure 8:
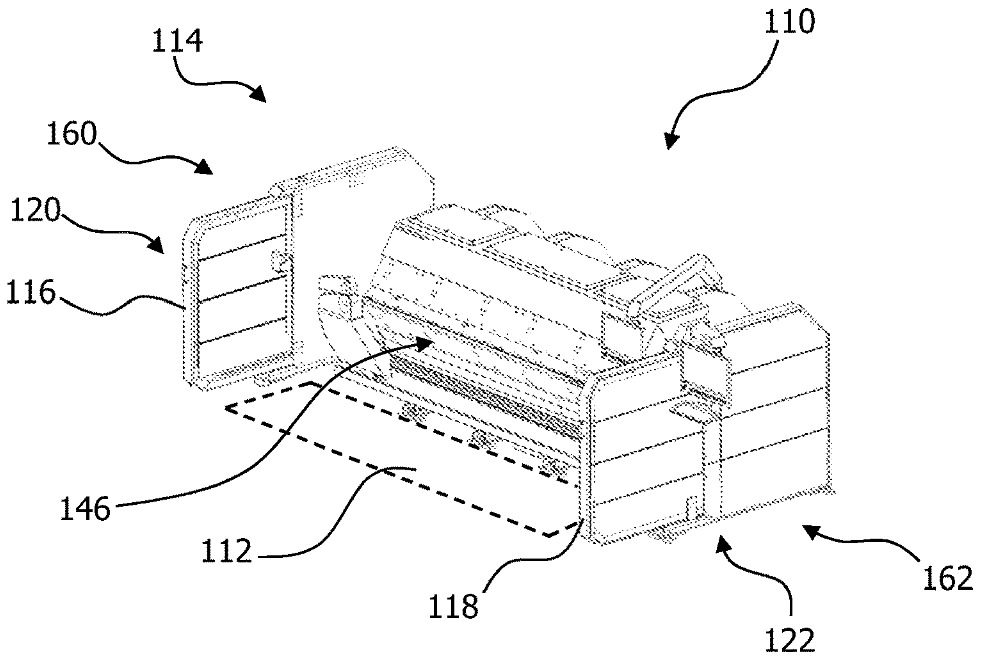
FIG. 8 is a schematic perspective view of a bending machine according to an alternative embodiment.

FIG. 8 is a schematic perspective view of a bending machine 110 according to another embodiment. Similar to the bending machine 10 described above, the bending machine 110 includes a safety module 114 having a first side wall 160 and a second side wall 162, each being sub-modules of the safety module 114. They each form a variable-size shield 120, 122. For this purpose, the side walls 160, 162 comprise extendable barriers 116, 118. They may be attached and/or supported and/or movable and/or configured in analogy to the barriers 16, 18 described above.

Similar to the bending machine 10 described above, the alternative bending machine 110 comprises a workpiece holder 146. A safety-relevant work area 112 is defined in front of the bending machine 110. This area may be closed off laterally with the shields 120, 122 by extending the barriers 116, 118.

Figure 9:
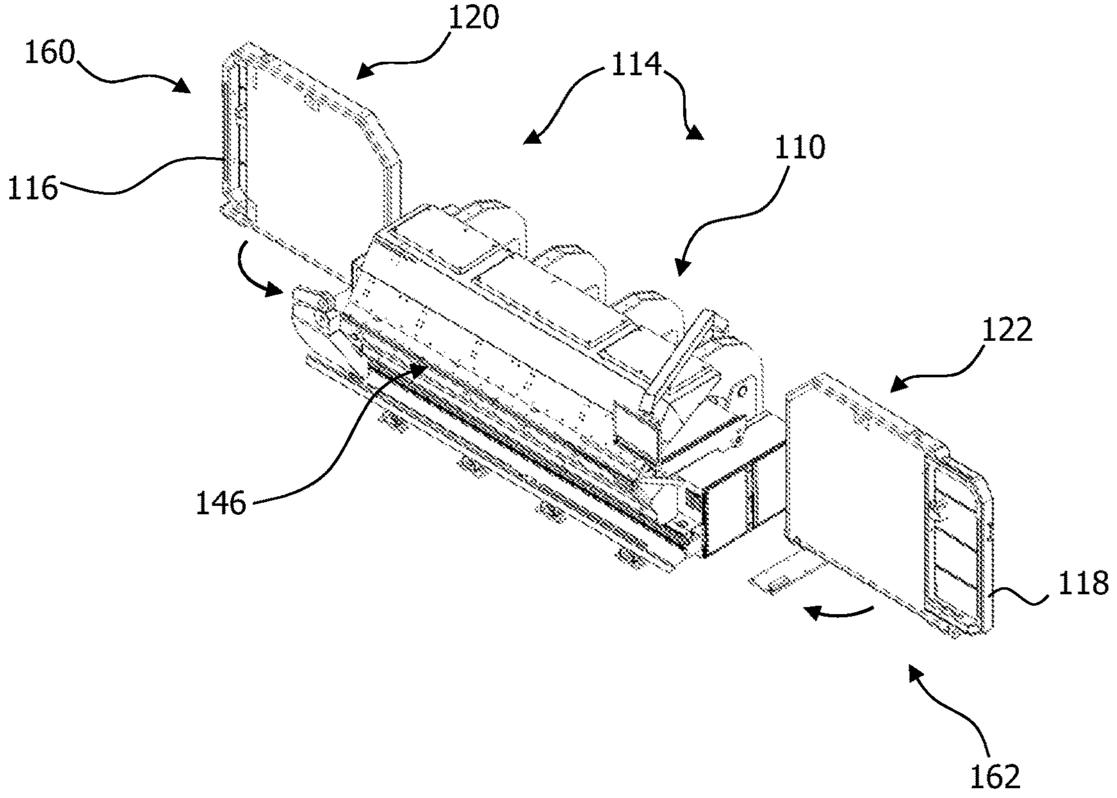
FIG. 9 is a schematic perspective view of the bending machine according to the alternative embodiment with pivoted shields.

The safety module 114 of the present embodiment is characterized in that the shields 120, 122 are pivotally mounted. FIG. 9 is a schematic perspective view of the bending machine 110 with the shields 120, 122 pivoted. The shields 120, 122 may be pivotable independently of the access state or the shut-off state, i.e. in particular independently of whether the respective safety barrier 116, 118 is retracted or extended. The shields 120, 122 may be pivotable laterally to the rear so that access from the side to the bending machine 10 and in particular to its workpiece holder 146 is released when the respective shield is in a pivot state. In this way, workpieces may also be fed laterally.

The first side wall 160 and the function of its shield 120 are described in more detail below. The description is transferable to the second side wall 122 and its shield 122. In the illustrated case, the two shields 120, 122 pivot in opposite directions. Some components may therefore be mirrored.

Figure 10:
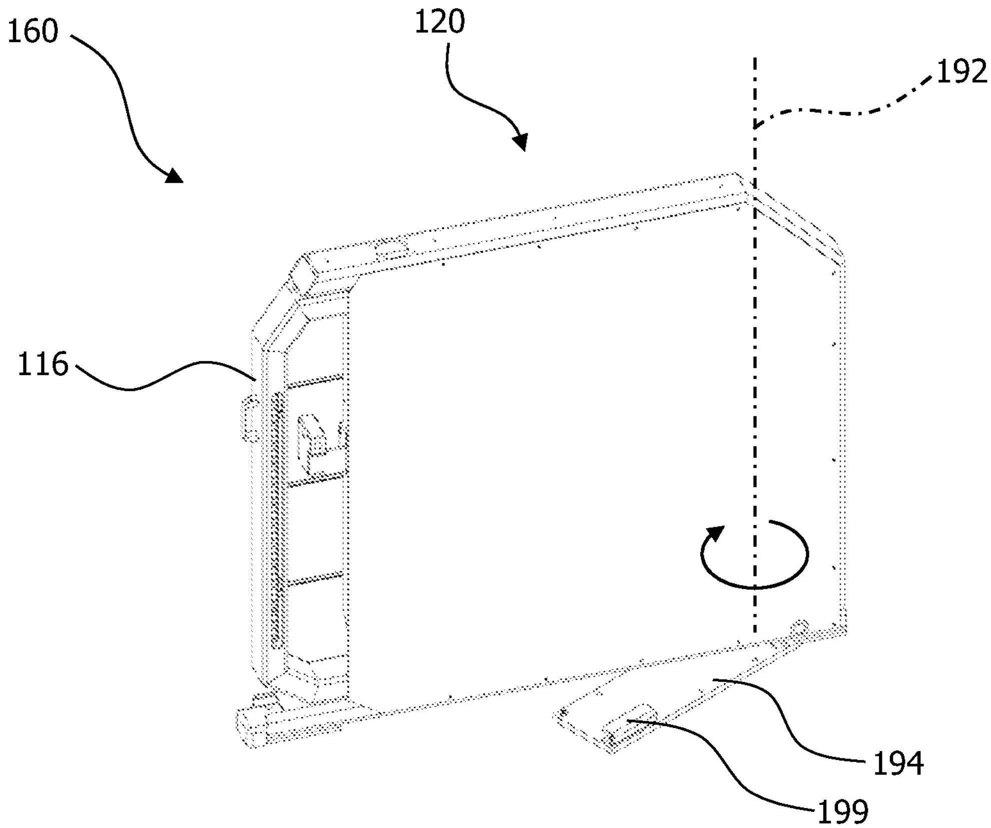
FIG. 10 is a schematic perspective view of a side wall of the bending machine according to the alternative embodiment in a partially pivot state.

FIG. 10 is a schematic perspective view of the first side wall 160 of the bending machine 110 in a partial pivot state of the shield 120. The shield 120 is pivotable about an axis of rotation 192. In the case shown, this axis extends vertically, parallel to a vertical direction of the bending machine 110 and/or perpendicular to an installation surface.

The side wall 160 includes a base plate 194. The base plate 194 defines the attachment point of the shield 120 about which the shield 120 is pivotable. For example, the base plate 194 may be screwed or otherwise secured to an installation surface. In other embodiments, the base plate 194 may be connected to a machine frame of the bending machine 110. In other embodiments, the shield 120 may further be pivotally attached to the machine frame in other ways, such as via suitable support arms, support struts or the like.

In accordance with the present embodiment, the safety module 114 includes a stop element 200. The stop element 200 is secured to the base plate 194. The stop element 200 defines a non-pivot position of the shield 120. Another stop element may further be provided to define a maximum pivot position. The shield 120 may be lockable in the non-pivot position and/or in a pivot position, in particular in a maximum pivot position.

Figure 11:
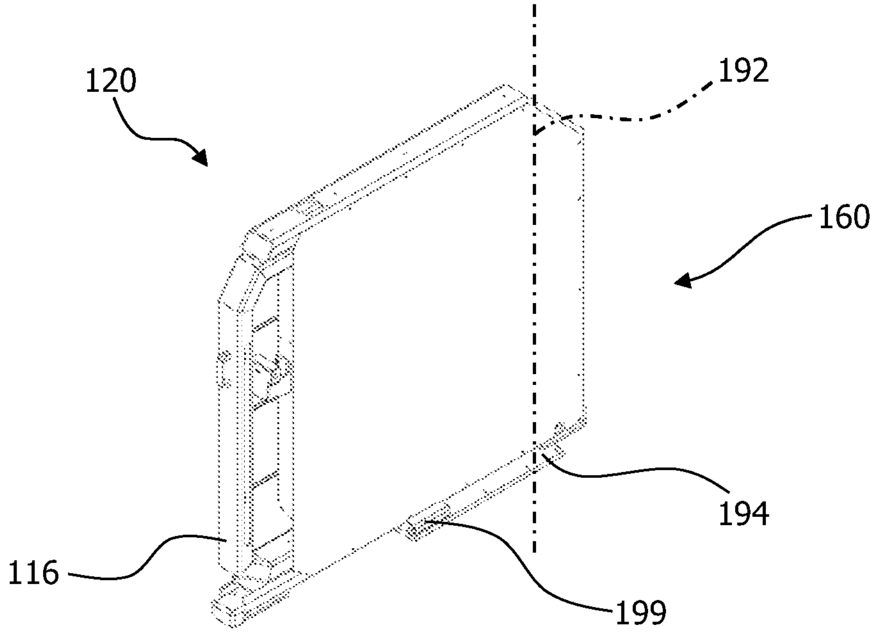
FIG. 11 is a schematic perspective view of the side wall in an access state.
Figure 12:
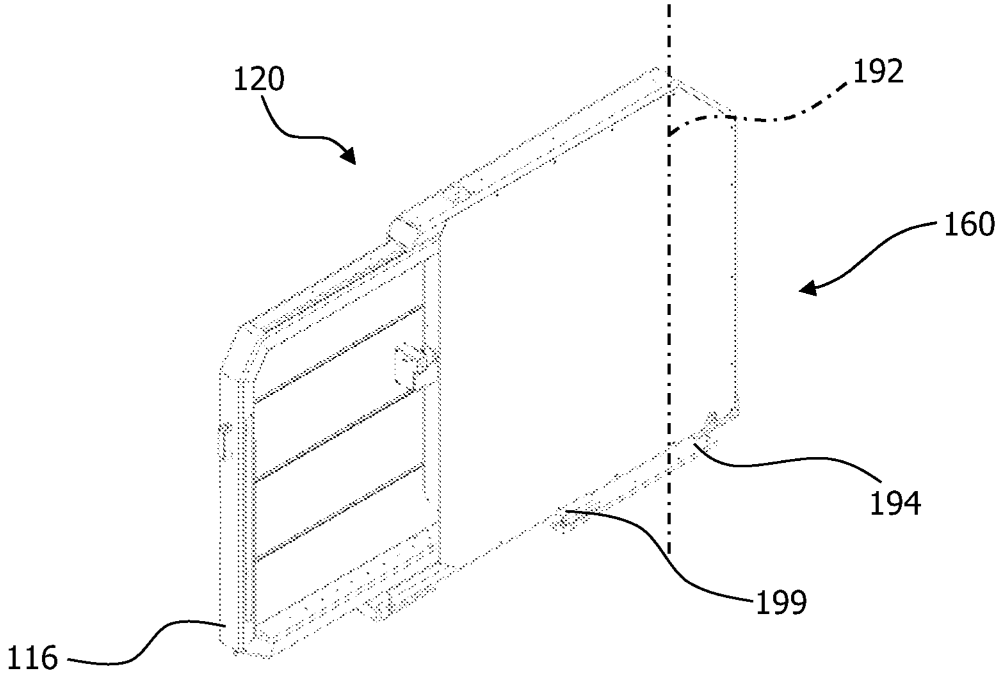
FIG. 12 is a schematic perspective view of the side wall in a shut-off state.

FIG. 11 is a schematic perspective view of the first side wall 160 in an access state. FIG. 12 is a schematic perspective view of the first side wall 160 in a shut-off state. As mentioned, the safety barrier 116 is retractable and extendable in a manner analogous to the safety barrier 16 described above to establish the access state or the shut-off state. In the access state and the shut-off state, the shield 120 is in its non-pivot position. In this position, extending the safety barrier 116 blocks the safety-relevant work area 12 laterally. Furthermore, regardless of the extension and retraction of the safety barrier 116, lateral access to the workpiece holder 146 is blocked in the non-pivot position.

Figure 13:
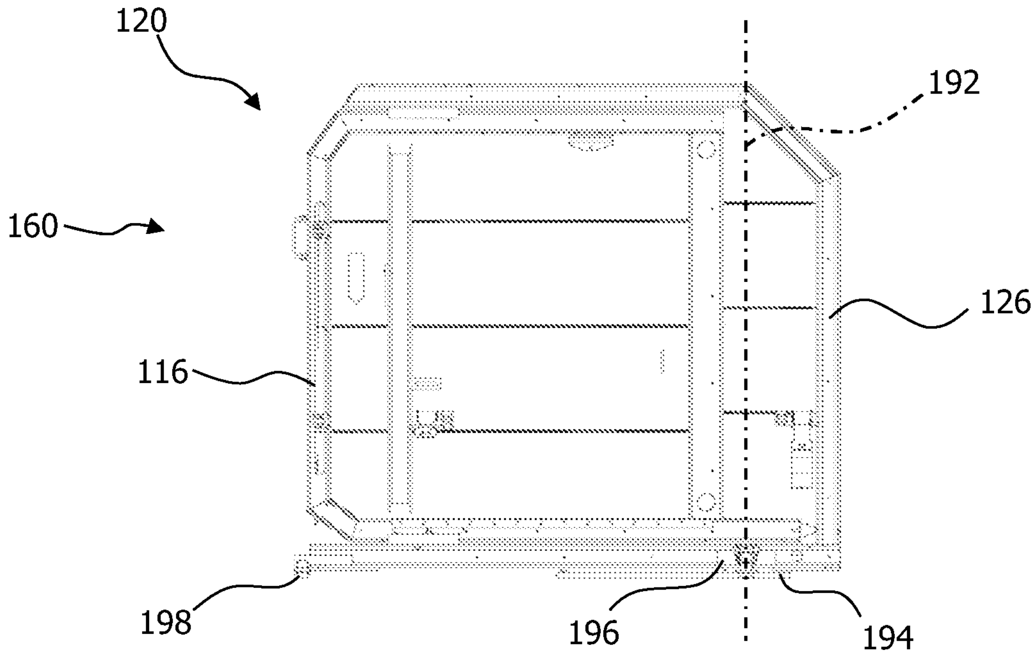
FIG. 13 is a schematic view of the interior of the side wall of the bending machine according to the alternative embodiment.
Figure 14:
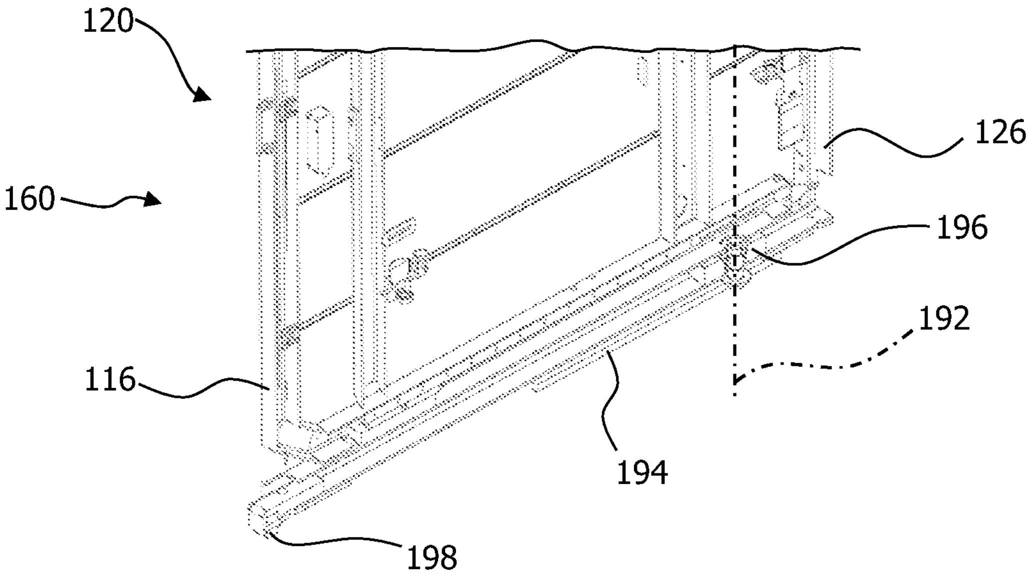
FIG. 14 is a schematic perspective view of a part of the interior of the side wall of the bending machine according to the alternative embodiment.

FIG. 13 is a schematic view of the interior of the first side wall 160. FIG. 14 is a schematic perspective view of a portion of the interior of the first side wall 160. The safety module 114 includes a support bearing 196 that defines the axis of rotation 192. In the illustrated case, the support bearing 196 is a component of the first side wall 160. The support bearing 196 connects the shield 120 to the base plate 194 and supports the shield 120 in the area of the axis of rotation 192. The support bearing 196 may be a pivot bearing.

The safety module 114 further comprises a roller 198. The roller 198 is attached to a frame 126 of the first side wall 160. The roller 198 is spaced apart from the support bearing 196 or the first axis of rotation 192. When the shield 120 is pivoted, the roller 198 rolls on an installation surface. Therefore, no additional guide rail or the like is required since the roller 198 supports the shield 120 at the front, its path of movement during pivoting being defined by the connection via the support bearing 196. In other embodiments, guidance may also be provided on a rail and/or in a link or the like.

According to the present embodiment, the shield 120 is pivotable manually. Alternatively or additionally, a suitable drive may be provided. Such drive may be activated automatically depending on an operating mode and/or in response to user input.

Figure 15:
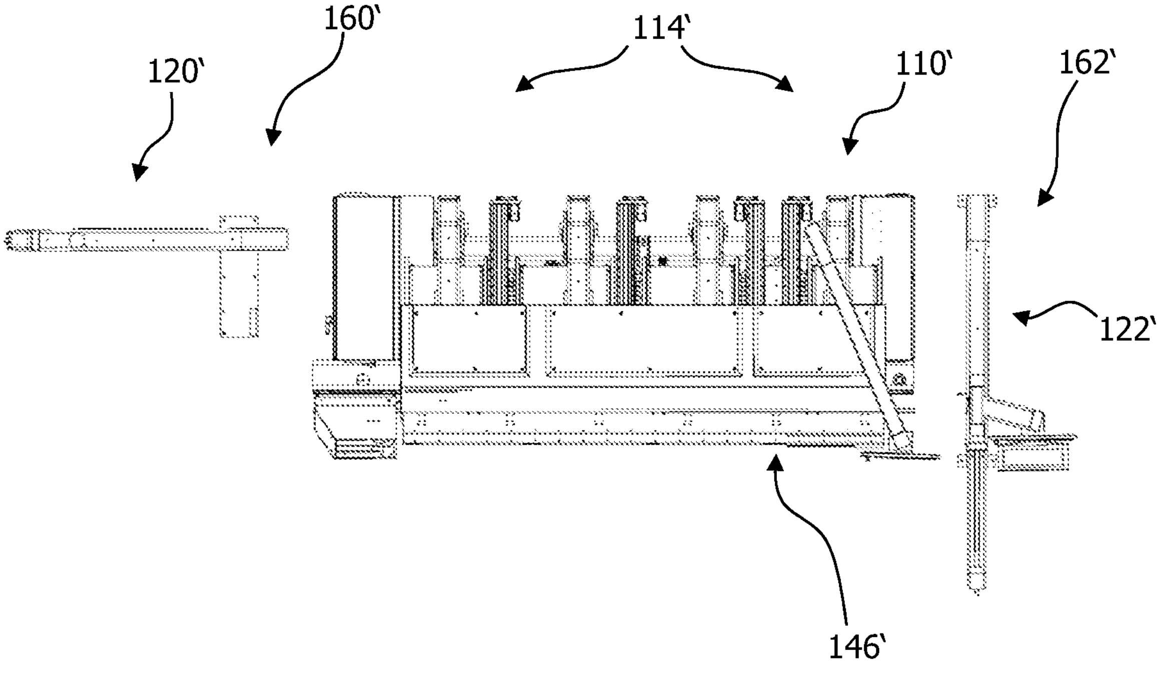
FIG. 15 is a schematic top view of a bending machine according to another alternative embodiment.

FIG. 15 is a schematic top view of a bending machine 110' according to a further alternative embodiment. The bending machine 110' and the bending machine 110 are essentially identical in construction. The reference signs of FIG. 15 correspond to those of FIGS. 9 to 14 but have an apostrophe to distinguish them. With regard to their description, reference is made to the above explanations.

The bending machine 110' differs from the bending machine 100 in that its safety module 114' includes two shields 120', 122' but only one of them is adapted to pivot. For example, a first side wall 160' is provided with a pivotable shield 120', whereas a second side wall 162' comprises a shield 122' configured like the shield 22 described in connection with the first embodiment. This allows access to the workpiece holder 146' of the bending machine 10' from the side to which the pivotable shield 120' is attached.

It is understood that bending machines may also be provided which include several safety modules, wherein individual safety modules in particular each from a single side wall. With regard to their description, reference is made to the above explanations.

The invention claimed is:

1. A bending machine which includes a safety-relevant work area in front of the bending machine and configured to allow an operator of the bending machine to be present during its operation, loading, and unloading, the bending machine having a safety module that comprises:

a safety barrier having first and second ends and which is at least one selected from the group consisting of (i) planar and (ii) plate-shaped, which provides a variable-size lateral shield for the safety-related work area such that a shut-off state and an access state can be generated, wherein in the shut-off state access to the safety-relevant work area is at least partially restricted and wherein in the access state access to the safety-relevant work area is at least partially granted in that the safety-relevant work area is not physically restricted from the front but only from the side, and wherein the lateral shield is a mechanical and/or physical shield comprising a solid material; and a frame comprising a first linear guide for slidably receiving the first end of the safety barrier and a second linear guide for slidably receiving the second end of the safety barrier such that the safety barrier is retractable into the frame and the safety barrier is extendable from the frame, wherein when the safety barrier is extended the safety barrier extends laterally and telescopically from the frame in a direction away from the bending machine and when the safety barrier is retracted the safety barrier retracts laterally and telescopically into the frame in a direction toward the bending machine.

2. The bending machine according to claim 1, wherein the safety module comprises a spring element that at least one selected from the group comprising (i) supports a movement of the safety barrier and (ii) damps a movement of the safety barrier.

3. The bending machine according to claim 1, wherein a part of the safety barrier, which forms the variable-size shield, is free-floating in the shut-off state.

4. The bending machine according to claim 3, wherein the part of the safety barrier forming the variable-size shield is structured such that no floor-arranged guide elements are used for the extended portion of the safety barrier.

5. The bending machine according to claim 1, wherein the safety module comprises a drive unit for the safety barrier, which is adapted to move the safety barrier.

6. The bending machine according to claim 5, wherein the drive unit comprises a traction drive including a closed rotating traction mechanism.

7. The bending machine according to claim 5, wherein the drive unit is controlled based on a force applied to the safety barrier by an operator.

8. The bending machine according to claim 1, wherein the bending machine is adapted to prevent or permit a bending process depending on at least one release signal, wherein the safety module is adapted to generate a release signal depending on whether or not the shut-off state prevails.

9. The bending machine according to claim 8, wherein the safety module comprises an optical detection unit and is adapted to generate a release signal for the release unit depending on a detection signal of the optical detection unit.

10. The bending machine according to claim 9, wherein at least one component of the optical detection unit is arranged on the safety barrier in such a way that the component moves along with the safety barrier.

11. The bending machine according to claim 9, wherein the optical detection unit comprises a light barrier, wherein the light barrier is attached to the safety barrier such that it moves along with the safety barrier.

12. The bending machine according to claim 9, wherein the optical detection unit comprises a safety laser which is arranged on a stationary component of the safety module and does not move along with the safety barrier.

13. The bending machine according to claim 1, wherein the safety module comprises a second safety barrier arranged opposite the safety barrier.

14. The bending machine according to claim 1, wherein the safety barrier is pivotably mounted about a pivot axis that extends vertically.

15. The bending machine according to claim 14, wherein the safety module comprises a base plate on which the safety barrier is pivotally mounted.

16. The bending machine according to claim 14, wherein the safety module comprises a roller that supports the safety barrier during pivoting and is spaced from the pivot axis.

17. The bending machine according to claim 14, wherein the safety barrier is movable between a pivot position and a non-pivot position, in a pivot position, the safety barrier allows lateral access to both the safety-relevant work area and a workpiece holder of the bending machine, wherein the safety barrier is movable to a non-pivot position in which at least one selected from the group consisting of (i) the shut-off state is generated and (ii) the access state is generated.

18. A method for processing a workpiece by means of a bending machine according to claim 14, the method comprising:

pivoting the safety barrier about a pivot axis, thereby allowing lateral access to a workpiece holder of the bending machine; and performing the loading of the bending machine with the workpiece by laterally feeding the workpiece into the workpiece holder.

19. The bending machine according to claim 1, wherein the first end of the shield defines an axis of rotation such that the shield is pivotable about the axis of rotation.

20. A method for processing a workpiece by means of a bending machine, wherein the bending machine includes a safety-relevant work area in front of the bending machine and configured to allow an operator of the bending machine to be present during its operation, loading, and unloading, wherein the bending machine comprises a safety barrier having first and second ends and which is configured in the form of a surface and/or plate, which provides a variable-size lateral shield for the safety-related work area and wherein the lateral shield is a mechanical and/or physical shield comprising a solid material, the bending machine comprising a frame comprising a first linear guide for slidably receiving the first end of the safety barrier and a second linear guide for slidably receiving the second end of the safety barrier such that the safety barrier is retractable into the frame and the safety barrier is extendable from the frame, and wherein in a shut-off state, the safety-relevant work area is accessible from the front but not accessible from the side and wherein in an access state, the safety-relevant work area is accessible from the front and accessible from the side, the method comprising:

retracting the safety barrier laterally and telescopically into the frame in a direction toward the bending machine to create an access state;

loading the bending machine with a workpiece;

extending the safety barrier laterally and telescopically from the frame in a direction away from the bending machine to create a shut-off state; and processing the workpiece.

* * * * *